(12) United States Patent
Yamasaki

(10) Patent No.: US 7,577,348 B2
(45) Date of Patent: Aug. 18, 2009

(54) FOCUS DETECTION APPARATUS AND OPTICAL APPARATUS

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/152,457

(22) Filed: Jun. 14, 2005

(65) Prior Publication Data
US 2005/0276593 A1 Dec. 15, 2005

(30) Foreign Application Priority Data
Jun. 15, 2004 (JP) ............................. 2004-177182

(51) Int. Cl.
*G02B 13/08* (2006.01)
(52) U.S. Cl. ..................................... 396/111
(58) Field of Classification Search .......... 396/111–114
See application file for complete search history.

(56) References Cited

U.S. PATENT DOCUMENTS

| | | | | |
|---|---|---|---|---|
| 5,237,167 A * | 8/1993 | Hibbard | .................... | 250/201.8 |
| 5,262,819 A * | 11/1993 | Ohtaka et al. | ................ | 396/114 |
| 5,400,093 A * | 3/1995 | Timmers | ..................... | 353/101 |
| 5,839,001 A * | 11/1998 | Ohtaka et al. | ................ | 396/114 |
| 6,643,460 B2 * | 11/2003 | Uchiyama et al. | ........... | 396/114 |
| 6,873,358 B1 * | 3/2005 | Shimizu | ................ | 348/240.99 |
| 2001/0003556 A1 * | 6/2001 | Ohmura | ....................... | 396/114 |

* cited by examiner

*Primary Examiner*—Melissa J Koval
*Assistant Examiner*—Fang-Chi Chang
(74) *Attorney, Agent, or Firm*—Cowan, Liebowitz & Latman, P.C.

(57) ABSTRACT

A focus detection apparatus is disclosed, which realizes both of vertical line detection and horizontal line detection over a wide area of an image-taking range in focus detection of a phase difference detection method. The focus detection apparatus includes an optical system, which divides a luminous flux from an image-taking optical system to form a first pair of optical images having an interval between them in a first direction and a second pair of optical images having an interval between them in a second direction, and a photoelectrical conversion device. The optical system includes an optical member, which provides a first optical action widening the interval between the first pair of the optical images in the first direction. The first optical action is different from a second optical action for the second pair of the optical images in the second direction.

17 Claims, 13 Drawing Sheets

PRIOR ART

PRIOR ART

FOCUS DETECTION APPARATUS AND OPTICAL APPARATUS

BACKGROUND OF THE INVENTION

The present invention relates to a focus detection apparatus for use in an optical apparatus such as a digital camera and a video camera.

Conventional focus detection of an image-taking optical system in a digital camera or the like is realized with a contrast detection method using an image-pickup device. Typically, the focus detection of such a contrast detection method presents the problem of taking a considerable time period for focus adjustment to achieve focusing since the highest contrast is found while an image-taking optical system is moved little by little on an optical axis.

To avoid the problem, focus detection is often performed with a phase difference detection method, for example in a digital camera on which a lens apparatus is removably mounted.

Since the focus detection of the phase difference detection method allows the determination of a defocus amount of an image-taking optical system, it has the advantage of significantly reducing the time taken to achieve focusing as compared with the contrast detection method.

The focus detection of the phase difference method includes vertical line detection in which focus detection is performed for an object having a contrast component in a horizontal direction and horizontal line detection in which focus detection is performed for an object having a contrast component in a vertical direction. To handle various objects, focus detection is performed by combining the vertical line detection and the horizontal line detection on an image-taking screen. In addition, focus detection of a cross type is performed in which the vertical line detection and the horizontal line detection are made at the same position on an image-taking screen.

In recent years, proposals have been made for multipoint focus detection in which a plurality of focus detection areas are provided for performing the vertical line detection and the horizontal line detection on an image-taking screen and area-type focus detection in which focus detection is performed in continuous areas over a wide range. As one of those focus detection methods, a prior art has been disclosed in which the area-type focus detection and the cross-type focus detection are performed (for example, see Japanese Patent Laid-Open No. 9-184965).

In the prior art, the abovementioned focus detection is applied to a camera on which a lens apparatus is removably mounted. FIG. 19 shows a section view of the center of the camera. In FIG. 19, reference character L shows the optical axis of an image-taking optical system. Although not shown, the image-taking optical system is disposed on the optical axis L to the left of FIG. 19. Reference numeral 2 shows a primary image-forming plane of the image-taking optical system. A main mirror 3 and a sub mirror 4 are placed in front thereof.

The main mirror 3 and the sub mirror 4 are moved out of image-forming luminous flux by a well-known quick-return-mechanism when images are taken. On the other hand, they are held at the positions shown in FIG. 19 when focus detection is made. Luminous flux for use in focus detection passes through a half mirror portion formed near the center of the main mirror 3 and is reflected downward by the sub mirror 4. Reference numeral 5 shows a primary image-forming plane of a focus detection optical system formed by the sub mirror 4, which is optically equivalent to the primary image-forming plane 2.

Then, the optical path is turned by a first flat mirror 6 and passes through an infrared cut glass 7, an aperture 8, and a secondary image-forming lens 9. The optical path is then turned downward by a second flat mirror 10 and finally directed to a focus detection sensor 11. The focus detection sensor 11 is formed of a cover glass and a sensor chip placed near a secondary image-forming plane.

The sub mirror 4 is formed along part of an ellipsoidal plane formed by rotating an ellipse around a central axis A as shown by a dotted line in FIG. 19. One of the two focal points of the ellipse is set to the exit pupil of the image-taking optical system. The other is set to a point B which is an intersection of the central axis A and the optical axis L turned by the sub mirror 4.

The point B is located such that the equivalent air distance from the central point of the focus detection aperture 8 to the first flat mirror 6 is equal to the air distance from the point B to the first flat mirror 6. Thus, the sub mirror 4 holds the aperture 8 and the exit pupil of the image-taking optical system in an image-forming relationship from the basic nature of the ellipse. In other words, it serves as a known field lens in the focus detection of the phase difference method, and the sub mirror 4 and the aperture 8 function as a pupil dividing means. It is possible to direct a plurality of luminous fluxes divided on the exit pupil of the image-taking optical system toward the focus detection optical system by setting appropriate openings in the aperture 8.

FIG. 20 shows a plan view showing the aperture 8 and the secondary image-forming lens 9 viewed from the infrared cut glass 7. Since the secondary image-forming lens 9 is hidden by the aperture 8, it is shown by dotted lines. The aperture 8 has a pair of openings 8-1 and 8-2 and a pair of openings 8-3 and 8-4. The secondary image-forming lens 9 has a pair of lens portions 9-1 and 9-2 and a pair of lens portions 9-3 and 9-4 corresponding to the respective openings.

Thus, of the luminous flux passing through the exit pupil of the image-taking optical system, luminous fluxes divided vertically by the openings 8-1 and 8-2 and luminous fluxes divided horizontally by the openings 8-3 and 8-4 are focused by the secondary image-forming lens 9 which has the four lens portions. Four optical images are formed on the secondary image-forming plane. The focus detection sensor 11 detects a phase difference in the four optical images associated with defocus of the image-taking optical system to realize the focus detection of the phase difference method.

FIG. 21 is a plan view showing the sensor chip of the focus detection sensor 11 viewed from the second flat mirror 10. The sensor chip has four sensor areas formed thereon corresponding to the four lens portions of the secondary image-forming lens 9, in which the lens portions 9-1 and 9-2 correspond to sensor areas 11-1 and 11-2, and the lens portions 9-3 and 9-4 correspond to sensor areas 11-3 and 11-4, respectively. Optical images projected on the sensor areas 11-1 and 11-2 are formed by the luminous fluxes passing through the openings 8-1 and 8-2, respectively, that is, the luminous fluxes divided vertically on the exit pupil of the image-taking optical system, so that the optical images are moved vertically in association with defocus of the image-taking optical system.

Thus, a phase difference in the optical images can be detected by vertically arranging pixels in columns in the sensor areas 11-1 and 11-2. Similarly, in the sensor areas 11-3 and 11-4, pixels are arranged horizontally in rows. In the sensor areas 11-1 and 11-2, the horizontal line detection is performed since an object having a contrast component in the vertical direction can be best detected. In the sensor areas 11-3 and 11-4, the vertical line detection is performed.

Since the aperture 8 is projected by the sub mirror 4 on the exit pupil of the image-taking optical system, the openings in FIG. 20 enlarged at a predetermined magnification show areas on the exit pupil through which luminous flux passes on the exit pupil. Supposing FIG. 20 is already enlarged at a magnification for projection on the exit pupil, the distance between the median points of the openings 8-1 and 8-2 represents the length of a baseline for the horizontal line detection, while the distance between the median points of the openings 8-3 and 8-4 represents the length of a baseline for the vertical line detection.

The circumscribed circle around the openings 8-1 and 8-2 represents the diameter of the exit pupil in which focus detection can be performed in the horizontal line detection, while the circumscribed circle around the openings 8-3 and 8-4 represents the diameter of the exit pupil in which focus detection can be performed in the vertical line detection. In the latter exit pupil diameter, focus detection can be performed in both of the vertical line detection and the horizontal line detection. In other words, the horizontal line detection is performed only in the smaller exit pupil diameter, while both of the vertical line detection and the horizontal line detection are performed in the larger exit pupil diameter. For example, only the horizontal line detection is performed with an F number of 5.6, and both of the vertical line detection and the horizontal line detection are performed with an F number of 2.8.

FIG. 22 shows the respective sensor areas reversely projected in an image-taking range on the primary image-forming plane 2. In FIG. 22, warping due to distortion is ignored. Focus detection areas 13 and 14 are present in the image-taking range 12. The focus detection area 13 is obtained by reversely projecting the sensor areas 11-1 and 11-2. Since the resulting areas almost match, they are shown as the focus detection area 13. Similarly, the focus detection area 14 corresponds to the sensor areas 11-3 and 11-4. Thus, the focus detection area 13 represents the region in which the horizontal line detection is performed, while the focus detection area 14 represents the region in which the vertical line detection is performed. The shaded area in FIG. 22 representing their overlapping corresponds to the area in which the cross-type focus detection is performed.

As described above, in the prior art, the focus detection of the phase difference method is performed over the wide area and the cross-type focus detection is realized in part of the area.

In general, to define a wider area of the image-taking range as the focus detection area, more luminous flux needs to be directed to the focus detection optical system. For that purpose, it is necessary to place the sub mirror 4 as close as possible to the primary image-forming plane 2 and to increase the light reflecting area of the sub mirror 4. This causes the primary image-forming plane 5 of the focus detection optical system to shift closer to the sub mirror 4 as shown in FIG. 19.

In a focus detection optical system using a known field lens, it is necessary to set the field lens and a field mask near the primary image-forming plan 5 of the focus detection optical system. These members are put into image-taking luminous flux, so that a mechanism for retracting them is required. However, in the prior art, the sub mirror 4 is formed along part of the ellipsoidal surface and is provided with the function of the pupil dividing means, which eliminates the need to provide the field lens. The sub mirror 4 also serves as the field mask when it is formed such that light is not reflected in any area of the sub mirror 4 other than the area necessary for focus detection.

For these reasons, the sub mirror 4 can be easily increased in size in the prior art. As a result, the focus detection of the phase difference method is realized over the wide area.

The prior art, however, has the following problem. Specifically, the relatively wide area can be ensured for performing the horizontal line detection in the image-taking screen, but the area for the vertical line detection is limited to near the central portion. The reason thereof will hereinafter be described.

To provide the area for the vertical line detection as large as the area for the horizontal line detection, it is contemplated that the sizes of the sensor areas 11-3 and 11-4 for the vertical line detection are increased to be about the sizes of the sensor areas 11-1 and 11-2. In the image-taking optical system, vignetting is present, so that the diameter of the exit pupil for use in focus detection changes according to the size of the focus detection area. In general, the diameter of the exit pupil is smaller as the focus detection area is larger, that is, the image height is larger.

To increase the size of the focus detection area for the vertical line detection in the prior art, it is necessary to reduce the interval between the openings 8-3 and 8-4 projected on the exit pupil by the sub mirror 4 in order to support the smaller diameter of the exit pupil. The interval between the lens portions 9-3 and 9-4 and the interval between the sensor areas 11-3 and 11-4 are also reduced accordingly. However, the sizes of the sensor areas 11-3 and 11-4 need to be increased to be about the sizes of the sensor areas 11-1 and 11-2. When the sizes of the areas are increased to reduce the interval between them, the respective sensor areas interfere with each other as apparent from FIG. 21.

In the prior art, the optical images are projected on the sensor areas 11-3 and 11-4 with the same size of the optical images projected on the sensor areas 11-1 and 11-2. Thus, the sensor areas 11-3 and 11-4 are placed at a certain distance from the sensor areas 11-1 and 11-2 in order to prevent interference between the respective optical images. When the interval between the lens portions 9-3 and 9-4 is reduced, the resulting optical images interfere with each other. For those reasons, the focus detection area for the vertical line detection can only be set near the central portion of the image-taking screen in the prior art.

BRIEF SUMMARY OF THE INVENTION

It is an object of the present invention to provide a focus detection apparatus which realizes both of the vertical line detection and the horizontal line detection over a wide area of an image-taking range in focus detection of the phase difference detection method.

According to an aspect, the present invention provides a focus detection apparatus having an optical system, which divides a luminous flux from an image-taking optical system to form a first pair of optical images having an interval between them in a first direction and a second pair of optical images having an interval between them in a second direction orthogonal to the first direction, and a photoelectrical conversion device, which photoelectrically converts each of the optical images. The optical system includes an optical member, which provides a first optical action widening the interval between the first pair of the optical images in the first direction. The first optical action is different from a second optical action of the optical member for the second pair of the optical images in the second direction.

According to another aspect, the present invention provides a focus detection apparatus having an optical system, which divides a luminous flux from an image-taking optical system to form a plurality of optical images, and a photoelectrical conversion device, which photoelectrically converts each of the optical images. The optical system includes an optical member, which provides a first optical action compressing the optical images in a first direction further than a second optical action compressing the optical images in a second direction.

According to yet another aspect, the present invention provides a focus detection apparatus having a pupil dividing member, which divides an exit pupil of an image-taking optical system in a first direction and a second direction, a secondary image-forming lens, which forms a first pair of optical images and a second pair of optical images from a luminous flux from a primary image-forming plane of the image-taking optical system, and a photoelectrical conversion device, which photoelectrically converts each of the optical images. The optical member having an anamorphic optical power is provided between the primary image-forming plane and the secondary image-forming lens.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
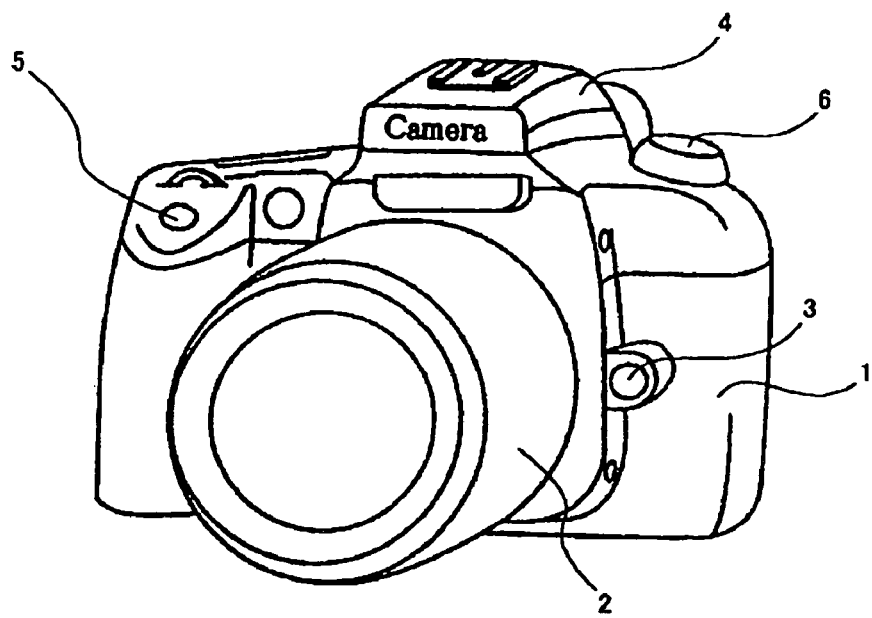
FIG. 1 is a prospective view showing the front of a camera which is an embodiment of the present invention.

First, description will be made of a camera serving as an image-taking apparatus which is an optical apparatus of an embodiment of the present invention with reference to FIG. 1. FIG. 1 is a perspective view showing the front of the camera. In FIG. 1, reference numeral 1 shows a camera body. A lens barrel 2 capable of zooming and focusing is removably mounted on the front of the camera body 1 at the center.

Reference numeral 3 shows a lens lock release button of a push-button type. The lens lock release button 3 can be pushed to remove the mounted lens barrel 2 from the camera body 1.

Reference numeral 4 shows an illumination unit which is provided for the camera body 1 in an openable and closable manner and is driven in an open direction in taking images to apply illumination light to an object. Reference numeral 5 shows a release switch. When the release switch 5 is operated with a first stroke, image-taking preparing operation (focus detection operation and photometric operation) is started, and when it is operated with a second stroke, image-taking operation (exposure of an image-pickup device such as a CCD sensor and a CMOS sensor, and record of taken images on a recording medium (not shown)) is started.

Reference numeral 6 shows an image-taking mode dial which can be operated to determine a shutter speed or an aperture value.

Figure 2:
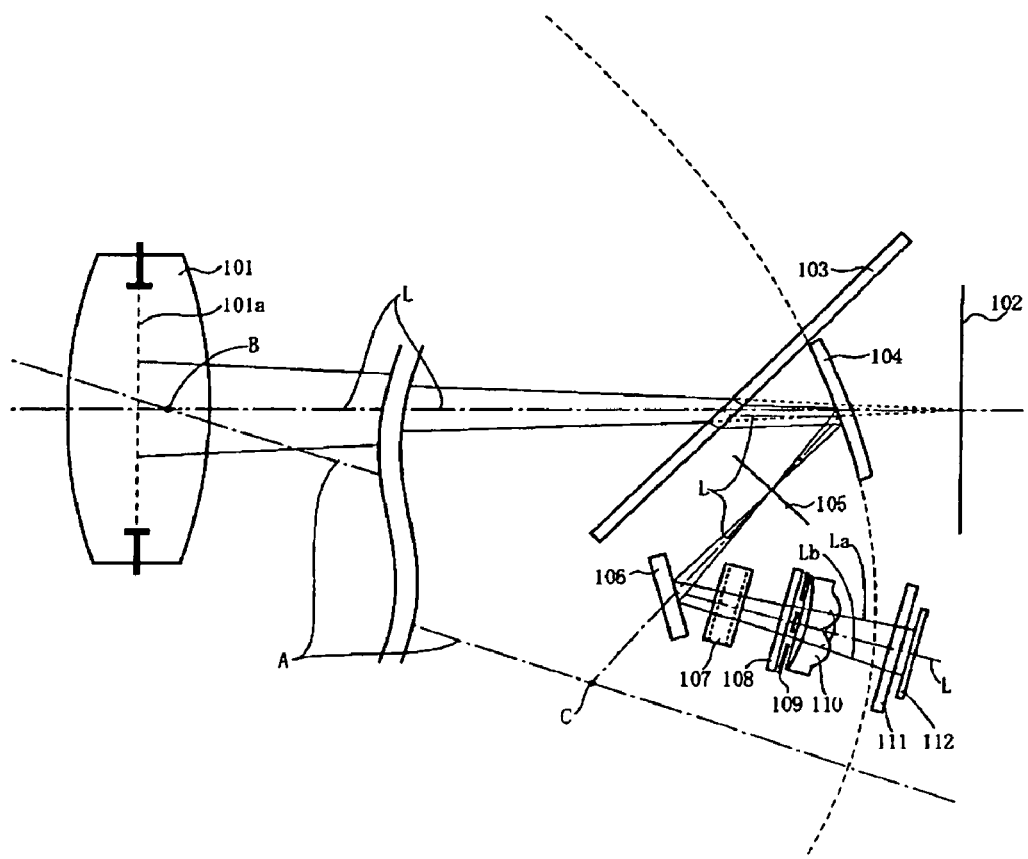
FIG. 2 is a section view of the center of the camera of Embodiment 1.

FIG. 2 is a section view of the center of the camera and shows only the portions associated with focus detection. In FIG. 2, reference numeral 101 shows an image-taking optical system, reference character L shows the optical axis of the image-taking optical system 101, and reference numeral 101a shows the exit pupil of the image-taking optical system 101. Reference numeral 102 shows a primary image-forming plane on which the image-pickup device (for example, a CCD sensor and a CMOS sensor) is placed for receiving an image formed by the image-taking optical system 101.

A main mirror 103 and a sub mirror 104 are disposed between the image-taking optical system 101 and the primary image-forming plane 102. The main mirror 103 has a half mirror near its central portion. Part of luminous flux passing through the image-taking optical system 101 is transmitted through the half mirror, and the remaining luminous flux is reflected upward and directed to a viewfinder optical system, not shown. The luminous flux transmitted through the main mirror 103 is reflected downward by the sub mirror 104. Reference numeral 105 shows a primary image-forming plane of a focus detection optical system which is optically equivalent to the primary image-forming plane 102.

The main mirror 103 and the sub mirror 104 are driven by a quick return mechanism such that they are moved out of the image-forming luminous flux when images are taken and they are placed across the image-taking optical path at other times (for example, when an object is observed).

The luminous flux reflected by the sub mirror 104 is again reflected by a flat mirror 106, passes through a cylindrical lens 107, an infrared cut glass 108, and an aperture 109, again focused on by a secondary image-forming lens 110, and arrives on a sensor chip 112 through a cover glass 111. The cylindrical lens 107 is an optical member having an anamorphic optical power.

The anamorphic optical power means different optical powers (the optical power is the reciprocal of a focal length) in orthogonal directions. Embodiment 1 employs the cylindrical lens 107 which is formed of a cylindrical surface having a negative optical power in the direction perpendicular to the paper and having no optical power in the direction in parallel with the plane, that is, the direction orthogonal to the former direction.

The sub mirror 104 is formed along part of an ellipsoidal surface formed by rotating an ellipse shown by a dotted line around an axis A, similarly to the prior art. One of the two focal points of the ellipse is set to a point B near the exit pupil 101a of the image-taking optical system. The point B is shifted closer to the primary image-forming plane than the exit pupil 101a on the optical axis L, and the reason thereof will be described later. The other focal point is set to a point C which is located such that the air distance from the central point C of the aperture 109 to the flat mirror 106 including the air distance equivalent to the thicknesses of the cylindrical lens 107 and the infrared cut glass 108 is equal to the air distance from the point C to the flat mirror 106.

Thus, the sub mirror 104 holds the exit pupil 101a of the image-taking optical system and the aperture 109 in an image-forming relationship. It is possible to direct luminous fluxes divided on the exit; pupil 101a of the image-taking optical system 101 by setting appropriate openings in the aperture 109.

Figure 3:
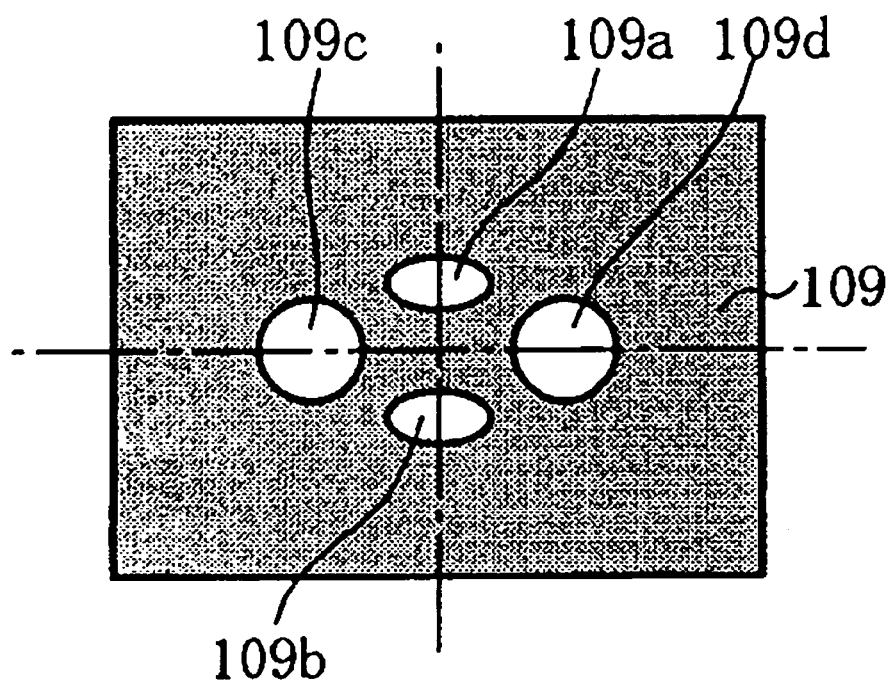
FIG. 3 is a plan view showing an aperture in the camera of Embodiment 1.

The sub mirror 104 and the aperture 109 correspond to a pupil dividing member. FIG. 3 is a plan view showing the aperture 109 viewed from the infrared cut glass 108. The aperture 109 has a pair of openings 109a and 109b and a pair of openings 109c and 109d formed therein. The openings are projected on the exit pupil 101a by the sub mirror 104.

The distance between the median points of the aperture openings 109a and 109b is substantially the same as the distance between the median points of the aperture openings 8-1 and 8-2 in the prior art. However, the distance between the median points of the aperture openings 109c and 109d is set to be slightly smaller than the distance between the median points of the aperture openings 8-3 and 8-4 in the prior art. This structure is used to eliminate vignetting of the image-taking optical system 101 even when the size of the area for focus detection performed with luminous flux passing through the aperture openings 109c and 109d is increased to be about the size of the openings 109c and 109d.

Figure 4:
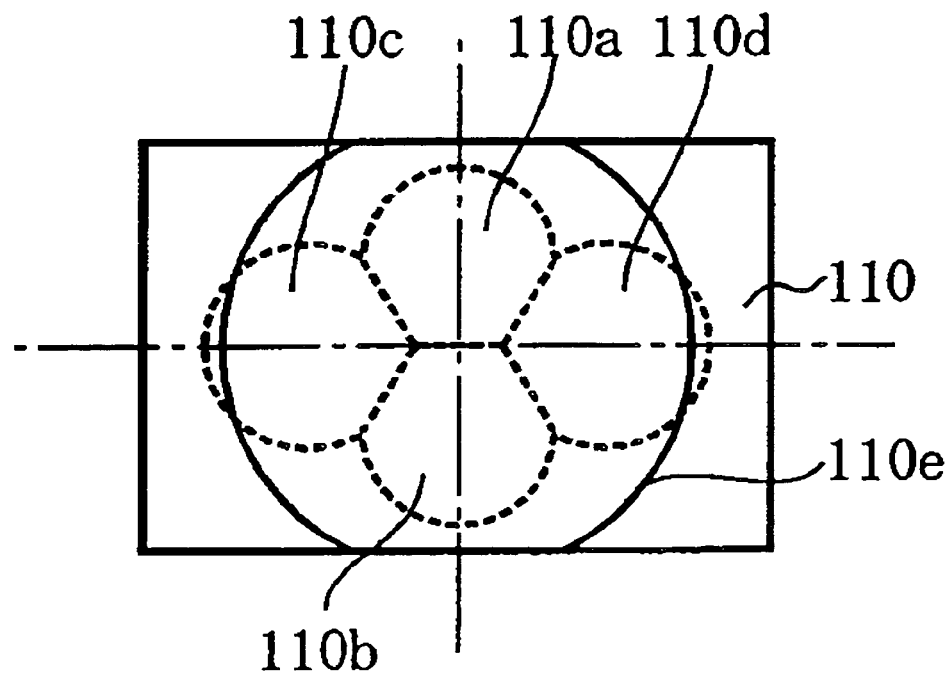
FIG. 4 is a plan view showing a secondary image-forming lens in the camera of Embodiment 1.

FIG. 4 is a plan view showing the secondary image-forming lens 110 viewed from the aperture 109. Thus, the lens shape on the exit side is shown by dotted lines. In FIG. 4, a pair of lens portions 110a and 110b and a pair of lens portions 110c and 110d are provided on the exit side corresponding to the four openings, respectively. A lens portion 110e formed of a single optical surface in common for the four lens portions is provided on the incident side. The luminous fluxes passing through the opening portions pass through the incident side and the exit side and are focused on near the sensor chip 112 to form four optical images. The section view of FIG. 2 shows only three lens portions 110a, 110b, and 110c of the four lenses on the exit side.

Figure 5:
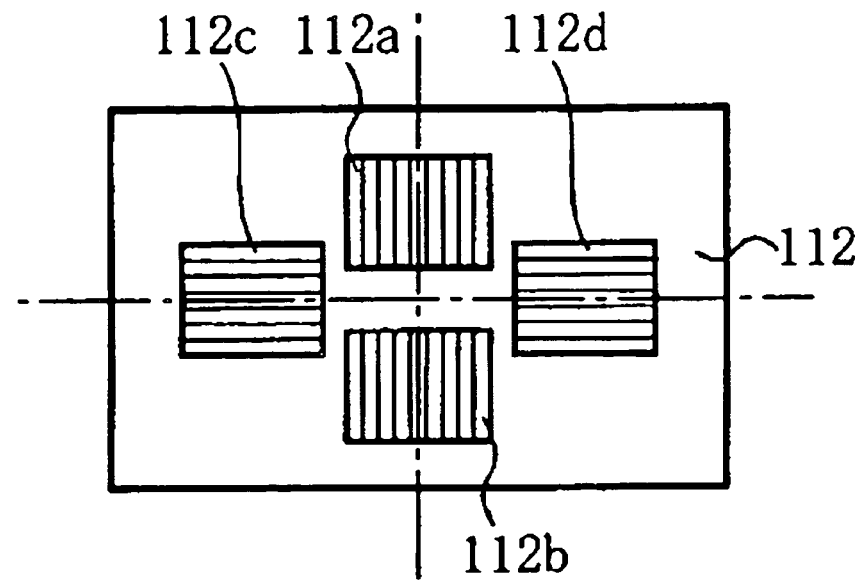
FIG. 5 is a plan view showing a sensor chip in the camera of Embodiment 1.

FIG. 5 is a plan view showing the sensor chip 112 viewed from the cover glass 111. The sensor chip 111 has a pair of sensor areas 112a and 112b and a pair of sensor areas 112c and 112d formed thereon, corresponding to the four lens portions. Specifically, the luminous flux passing through the opening portion 109a passes through the lens portions 110e and 110a to form a single optical image which is detected by the sensor area 112a. The same applies to the sensor areas 112b, 112c, and 112d. The four optical images are shifted in the direction of the division of the exit pupil 101 when the image-taking optical system 101 is defocused. A phase difference associated with the shift of the optical images is detected by the respective sensor areas.

As a means for detecting the phase difference, it is possible that an image signal corresponding to the optical image is formed from the output signal of the sensor chip 112 and a well-known correlation means or the like is used. Since the relationship between the phase difference and the defocus amount of the image-taking optical system 101 can be generally approximated with a predetermined function, focus adjustment can be performed by detecting the phase difference. The details thereof will be described later.

In the second image-forming lens 110, the lens portion 110e on the incident side is formed of a concave surface in a generally spherical shape. The center of the sphere is set to a position optically equivalent to near the center of the primary image-forming surface 105 of the focus detection optical system. Each of the lens portions on the exit side is formed of a convex surface in a generally spherical shape. The center of each sphere is set to the center of the associated opening of the aperture 109. Since a light beam passing through the center of the sphere is not refracted by the optical surface, a light beam emerging from the center of the primary image-forming surface 105 of the focus detection system and passing through each of the aperture openings is not refracted. A light beam La and a light beam Lb in FIG. 2 represent the abovementioned light beams for the lens portions 110a and 110b and travel substantially linearly from the primary image-forming surface 105 of the focus detection optical system 1 to the sensor chip 112.

While the infrared cut glass 108 and the cover glass 111 are flat plates and thus refract the light beams, the incident angle is equal to the emerging angle. The cylindrical lens 107 has the curved surfaces on the incident surface and the emerging surface, but it can be considered similarly to a flat plate in FIG. 2 since the optical powers are provided in the directions perpendicular to the paper. If the abovementioned flat plates are ignored, the light beams La and Lb are not refracted at all, so that no refraction occurs even when the wavelength is changed. For this reason, accurate focus detection can be achieved with no wavelength dependence.

The focus detection apparatus in Embodiment 1 has been described. As seen, the basic structure is substantially the same as that of the prior art except the cylindrical lens 107. The problem as in the prior art arises when the distance between the median points of the aperture openings 109c and 109d is simply reduced to increase the sensor areas 112c and 112d. However, this can be avoided by inserting the cylindrical lens 107. The details thereof will hereinafter be described.

Figure 6:
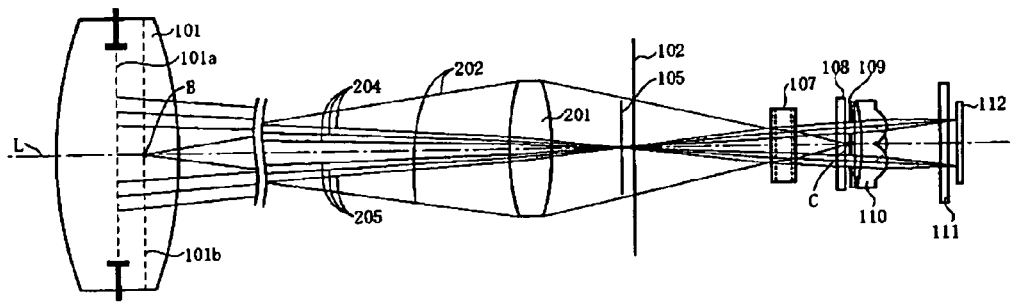
FIG. 6 shows the straight layout of an optical system in a vertical section of the camera of Embodiment 1.

To clearly explain the optical actions of the cylindrical lens 107, we use figures in which the respective mirrors are laid out straight from the image-taking optical system 101 to the sensor chip 112. Since the cylindrical lens 107 has the different optical powers in the orthogonal directions, we use two section views when the mirrors are laid out straight, that is, a vertical section view of the image-taking optical system 101 as shown in FIG. 2 and a horizontal section view orthogonal to the vertical section view. FIG. 6 shows the straight layout of the optical system in the vertical section view, while FIG. 7 shows the straight layout of the optical system in the horizontal section view.

Figure 7:
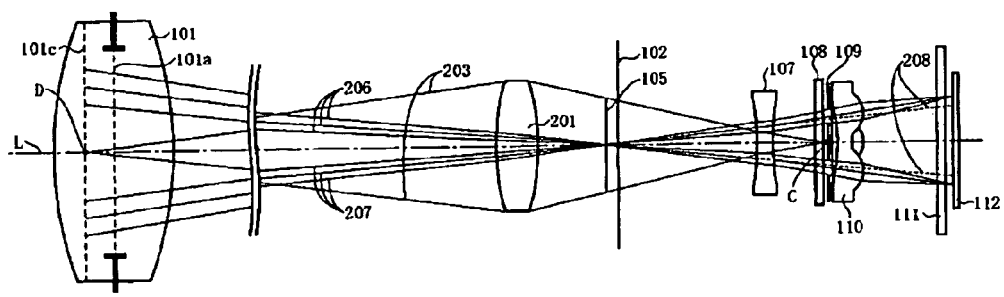
FIG. 7 shows the straight layout of the optical system in a horizontal section of the camera of Embodiment 1.

In FIGS. 6 and 7, a convex lens 201 is an optical member in the straight layout which replaces the sub mirror 104 in FIG. 2. Since the sub mirror 104 is formed along part of the ellipsoidal surface having a converging power, it can be generally replaced with the convex lens. The primary image-forming plane 105 of the focus detection optical system is slightly closer to the image-taking optical system 101 than the primary image-forming plane 102. This is because the sub mirror 104, that is, the convex lens 201 has a positive optical power. The cylindrical lens 107 optically acts as a flat plate in the section of FIG. 6, while it acts as a concave lens in the section of FIG. 7.

First, description will be made of a pupil image-forming optical system with the pupil image-forming member. In FIG. 6, light beams 202 emerging from the aperture center C are focused on a point B near the exit pupil 101a. This is apparent from the fact that the focal points of the ellipsoidal sub mirror 104 are defined as the points B and C in FIG. 2. On the other hand, in FIG. 7, light beams 203 emerging from the same point C are focused on a point D near the exit pupil 101a. This is because the cylindrical lens 107 acts as the concave lens having a negative optical power. In other words, the points B and C are set to have the conjugate relationship in FIG. 6, so that the light beams are focused on the point D closer to the infinite end than the point B in FIG. 7.

Thus, the position of the projected image by the convex lens 201 from the aperture 109 in the vertical section is slightly different from that in the horizontal section. To be exact, the position in the vertical section is shown as 101b, while the position in the horizontal section is shown as 101c. However, the fact remains that the aperture 109 and the convex lens 201, that is, the pupil dividing member of Embodiment 1, directs the luminous fluxes divided on the exit pupil 101a to allow the focus detection of the phase difference method.

In Embodiment 1, the position of the point B is set to the position on the opposite side of the exit pupil 101a to the point D in view of the shift of the point D toward the infinite end. In addition, the exit pupil 101a is set at the position near the midpoint between the points B and D. Thus, the average positions of the projected image planes 101b and 101c are close to the exit pupil 101a, and the luminous flux passing through near the exit pupil 101a can be directed efficiently to the secondary image-forming optical system.

Figure 8A:
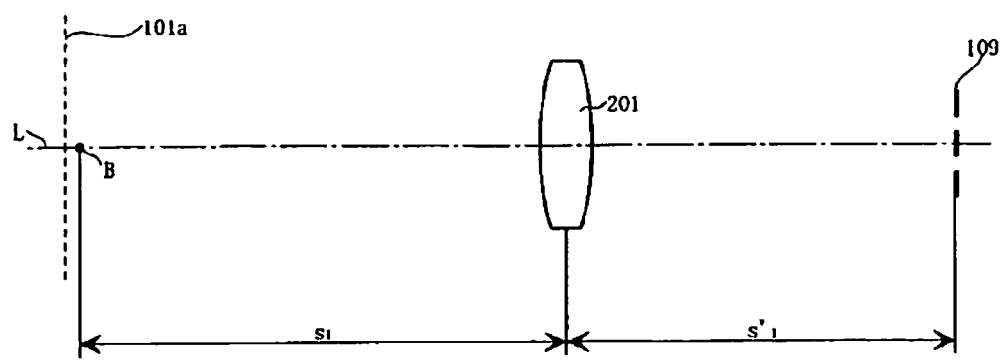
FIG. 8A and FIG. 8B show the straight layouts of a pupil image-forming optical system in Embodiment 1.
Figure 8B:
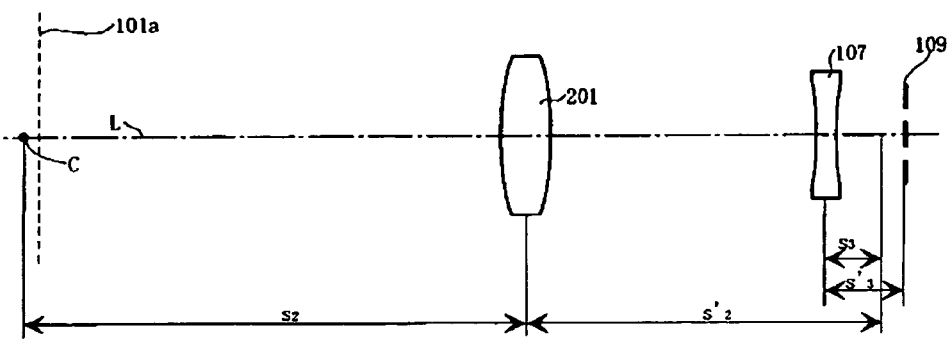

Next, the image-forming magnification will be calculated in the pupil image-forming optical system. FIGS. 8A and 8B show the straight layouts of the pupil image-forming optical system. FIGS. 8A and 8B correspond to FIGS. 6 and 7, respectively.

The distance from each optical member to each image-forming point is defined as shown. Based on the rules of calculations of geometrical optics, the distance set from each optical member takes a negative value on the left of the optical member, and a positive value on the right of the optical member. The exit pupil 101a and the aperture 109 are considered as an object plane and an image plane, respectively. The image-forming magnification is calculated with the ratio of the distance on the object side to the distance on the image side.

The infrared cut glass 108 which is the flat plate is omitted since it has no optical power. In FIG. 8A, the cylindrical lens 107 is also omitted since it acts as the flat plate. Each optical member is assumed to be infinitely thin and the principal point or the like is ignored.

First, in the vertical section of FIG. 8A, the pupil image-forming magnification $\beta VP$ is represented by:

$$\beta_{VP} = \frac{s'_1}{s_1} \quad (1)$$

On the other hand, in the horizontal section of FIG. 8B, it is assumed that the image between the cylindrical lens 107 and the aperture 109 formed by the convex lens 201 is focused on the aperture 109 by the cylindrical lens 107, so that the total image-forming magnification is equal to the product of the image-forming magnification by the convex lens 201 and the image-forming magnification by the cylindrical lens 107. The image-forming magnification $\beta HP$ is represented by:

$$\beta_{HP} = \frac{s'_2}{s_2} \cdot \frac{s'_3}{s_3} \quad (2)$$

where s2 and s'2 can be expressed using s1 and s'1 by:

$$s_2 \approx s_1$$

$$s'_2 = s'_1 - s'_3 + s_3 \quad (3)$$

Since s1 and s2 are larger than the other distances and the difference between them is small, approximating them as in expression (3) presents no problems. The expression (3) is substituted into the expression (2) for expression using the $\beta VP$ in the expression (1) as:

$$\beta_{HP} = \frac{s'_3(s'_1 - s'_3 + s_3)}{s_1 \cdot s_3} = \beta_{VP} \cdot \frac{s'_3(s'_1 - s'_3 + s_3)}{s'_1 \cdot s_3} \quad (4)$$

In the expression (4), only the fraction term is considered to calculate the difference between the denominator and the numerator as:

$$(\text{denominator}) - (\text{numerator}) = (s'_1 - s'_3) \cdot (s_3 - s'_3) \quad (5)$$

Since (s'1−s'3)>0 and (s3−s'3)<0, the solution of the expression (5) is smaller than zero. Thus, the fraction term of the expression (4) takes a value larger than one, and $\beta VP > \beta HP$ when $\beta VP<0$ and $\beta HP<0$.

$\beta VP$ and $\beta HP$ are the image-forming magnifications when the aperture 109 is used as the image plane. The projection magnification on the exit pupil 101a is the reciprocal thereof. When the reciprocals are represented as $\gamma VP$ and $\gamma HP$, $\gamma VP<\gamma HP$ when $\gamma VP<0$ and $\gamma HP<0$.

In other words, the absolute value of the projection magnification on the exit pupil 101a in the horizontal direction is smaller than that in the vertical direction, and the projected aperture opening has a shape shrunk in the horizontal direction. The magnifications are the negative values because the images are laterally reversed.

Figure 9:
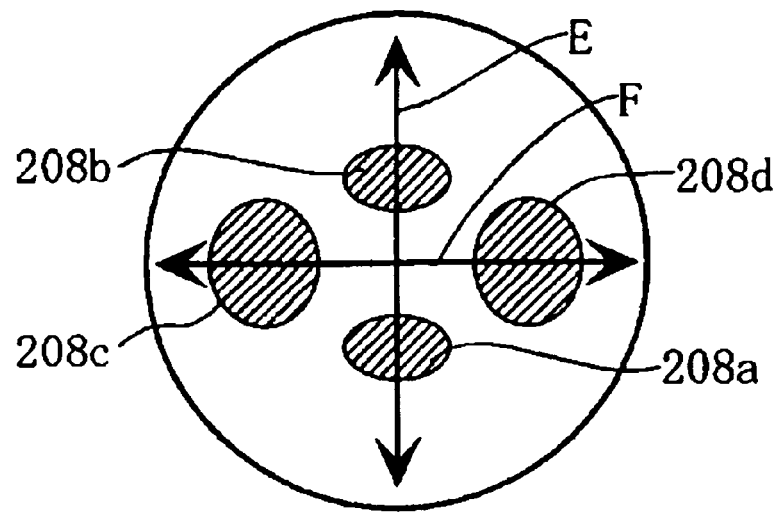
FIG. 9 is a plan view showing an exit pupil in Embodiment 1.

FIG. 9 shows the shapes and is a plan view showing the exit pupil 101a in FIG. 2 viewed from the primary image-forming plane 102. In FIG. 9, a pair of shaded areas 208a and 208b and a pair of shaded areas 208c and 208d are obtained by projecting the respective openings of the aperture 109, and the luminous flux for focus detection passes through the areas. The shaded areas 208a and 208b correspond to the openings 109a and 109b of the aperture 109, and the shaded areas 208c and 208d correspond to the openings 109c and 109d of the aperture 109, respectively.

It can be seen that the four shaded areas have shapes provided by horizontally compressing the openings of the aperture 109 shown in FIG. 3. For example, the generally circular opening 109c on the aperture 109 corresponds to the shaded area 208c on the exit pupil 101a which has an elliptical shape with its longer axis along the vertical direction. Thus, it is necessary to consider the shrunk shapes with the longer axis along the vertical direction in setting the openings of the aperture 109. In Embodiment 1, the openings are formed as shown in FIG. 3, assuming that the shaded areas are provided on the exit pupil 101a.

Since the image-forming positions in the vertical section and horizontal section are on the closest side and infinity side of the exit pupil 101a, respectively, the shaded areas are projected with blur on the exit pupil 101a. However, the fact remains that the exit pupil 101a is divided, and the amount of the blur is small due to the slight shifts from the exit pupil 101a, so that the focus detection of the phase difference method can be achieved.

In FIG. 9, an arrow E shows the pupil dividing direction with the pair of shaded areas 208a and 208b, and an arrow F shows the pupil dividing direction with the pair of shaded areas 208c and 208d. In claims, the arrow E and the arrow F correspond to a first direction and a second direction, respectively.

Figure 10:
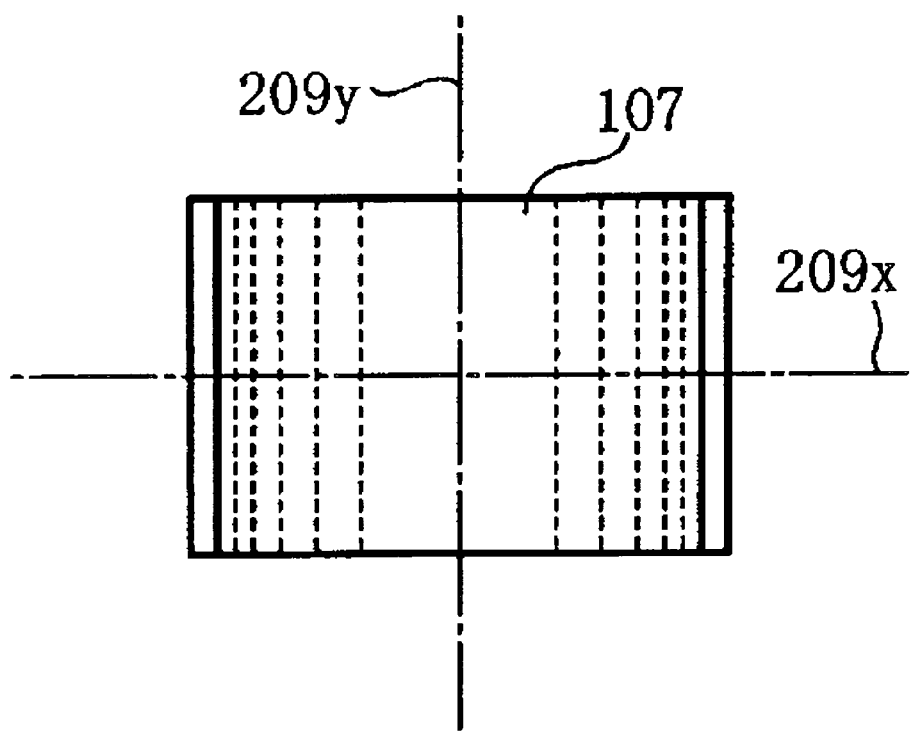
FIG. 10 is a plan view showing a cylindrical lens in Embodiment 1.

FIG. 10 is a plan view showing the cylindrical lens 107 in FIG. 2 viewed from the flat mirror 106, and to be exact, it shows a plane perpendicular to the optical axis L turned by the flat mirror 106. In FIG. 10, dotted lines show contour lines which represent the height of the cylindrical lens 107 in the direction perpendicular to the paper and are given to facilitate the understanding of the shape of the surface. The cylindrical lens 107 has the concave shape with a smaller height at a position closer to the center.

Dashed lines 209x and 209y show two principal axes of the cylindrical lens 107. The principal axes refer to the central lines orthogonal to each other with respect to which the height of the optical surface in the direction orthogonal to the paper, that is, the sag amount of the optical surface is symmetric when the optical member having the anamorphic optical power is shown in a plane as shown in FIG. 10. However, the cylindrical surface is used in Embodiment 1, so that any line may serve as the principal axis as long as it is a line in parallel with the line 209x.

The optical axis L is set to pass through near the intersection of the principal axes 209x and 209y. Thus, the four shaded areas in FIG. 9 have substantially equally shrunk shapes horizontally centered on the optical axis L.

The distance between the median points of the shaded areas on the exit pupil 101a depends on the image height in the focus detection area under the influence of the sub mirror 104 and the cylindrical lens 107. In other words, the base line length for focus detection of the phase difference method varies. However, the focus detection of the phase difference method can be performed conventionally by using correction processing of a focus detection image signal described in Japanese Patent Laid-Open No. 10-311945.

While the cylindrical lens 107 has concave shapes on both sides in Embodiment 1, the shape on the back is similarly structured. It is possible that only one side has a concave surface and the other has a flat surface.

Next, the secondary image-forming optical system will be described. In FIG. 6, luminous fluxes 204 and 205 are formed of light beams passing through the central point and endpoints of the pair of openings 109a and 109b of the aperture 109, and are focused on the sensor chip 112. In FIG. 7, luminous fluxes 206 and 207 are formed of light beams passing through the central point and endpoints of the other pair of openings 109c and 109d of the aperture 109, and are focused on the sensor chip 112.

These luminous fluxes 204, 205, 206, and 207 are the luminous fluxes for the secondary image-forming optical system when the image-taking optical system 101 is focused on the primary image-forming surface 102, that is, focusing is achieved.

The luminous fluxes 204 and 205 are divided vertically on the exit pupil 101a by the optical action of the pupil dividing member and slightly condensed by the optical power of the convex lens 201 and focused on the primary image-forming plane 105 of the focus detection optical system. They are incident on the secondary image-forming lens 110 through the cylindrical lens 107 equivalent to a flat plate, the infrared cut glass 108, and the aperture 109. The light beam passing through the central point of the aperture opening is not refracted by the secondary image-forming lens 110 and the other light beams are refracted thereby to form an image on the sensor chip 112 through the cover glass 111.

When the image-taking optical system is defocused, the optical image is moved in the direction on the sensor chip corresponding to the arrow E which is the exit pupil dividing direction. The luminous fluxes 206 and 207 are divided horizontally on the exit pupil 101a by the optical action of the pupil dividing member and similarly focused on the primary image-forming plane 105 of the focus detection optical system.

The luminous fluxes 206 and 207 are refracted by the cylindrical lens 107 in directions in which they travel away from each other, and are incident on the secondary image-forming lens 110 through the infrared cut glass 108 and the aperture 109. The light beam passing through the central point of the aperture opening is slightly refracted by the secondary image-forming lens 110, and the other light beams are also refracted to form an image on the sensor chip 112 through the cover glass 111. When the image-taking optical system is defocused, the optical image is moved in the direction on the sensor chip corresponding to the arrow F which is the exit pupil dividing direction.

In FIG. 7, dotted lines 208 show light beams when they pass through the central points of the pair of openings and are not refracted by the cylindrical lens 107. It can be seen that the luminous fluxes 206 and 207 are refracted in directions in which they travel away from each other by the optical action of the cylindrical lens 107. Thus, the optical images formed on the sensor chip 112 are formed at positions away from each other compared with the case where the cylindrical lens 107 is not used. In other words, the cylindrical lens 107 increases the interval between the pair of optical images formed by the luminous fluxes 206 and 207.

As a result, in Embodiment 1, even when the distance between the median points of the aperture openings 109c and 109d is reduced, the four optical images formed on the sensor chip 112 do not interfere with each other. It is thus possible to set the four sensor areas as shown in FIG. 5.

The luminous fluxes passing through the aperture openings 109a and 109b in FIG. 6 are formed into images on the sensor chip 112 in this section. In the section orthogonal to FIG. 6, however, the luminous fluxes are formed into images at positions slightly shifted from the sensor chip 112 under the influence of the cylindrical lens 107. The same applies to FIG. 7. Specifically, the luminous fluxes passing through the openings 109c and 109d are formed into images on the sensor chip 112, but the image-forming positions are shifted in the section orthogonal to FIG. 7.

Stated differently, when the secondary image-forming lens 110 is formed of the spherical surface and the cylindrical lens 107 is provided in the optical path to form an image at a predetermined position in a particular section, the image-forming position is shifted in principle on the section orthogonal to that section.

However, the optical image is detected with an array of pixels in the focus detection of the phase difference method, so that attention is paid only on the contrast component in an image in the one dimensional direction. This means that it is only necessary that required resolution is provided at least in the one dimensional direction. The one dimensional direction corresponds to the moving direction of the image. Thus, in Embodiment 1, each luminous flux is formed into an image on the sensor chip 112 in the image moving direction as shown in FIGS. 6 and 7.

Figure 11A:
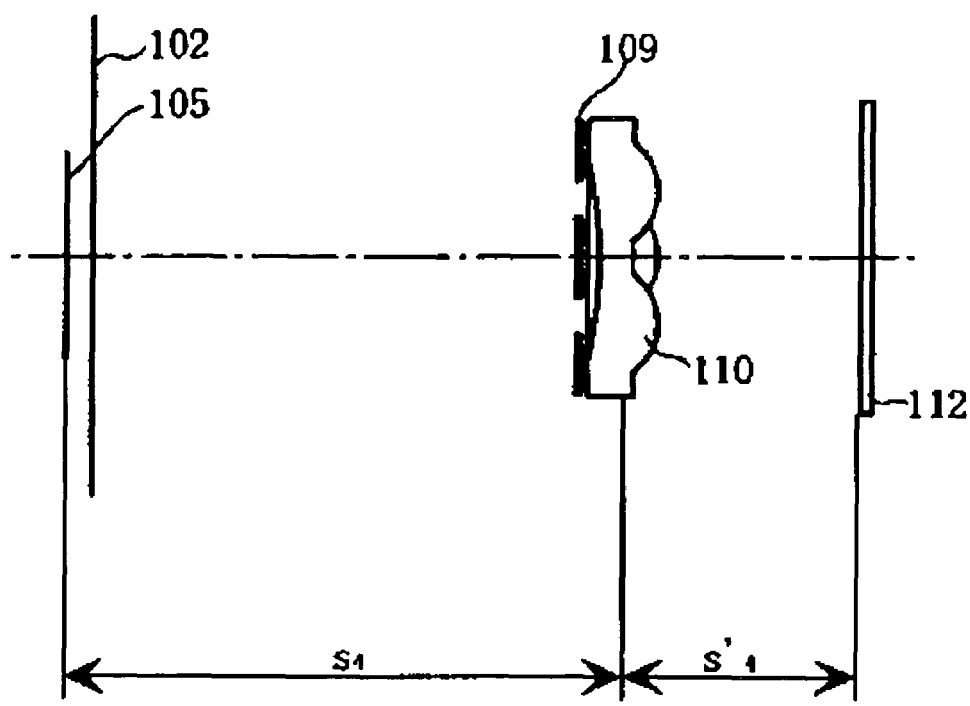
FIG. 11A and FIG. 11B show the straight layouts of a secondary image-forming optical system in the camera of Embodiment 1.
Figure 11B:
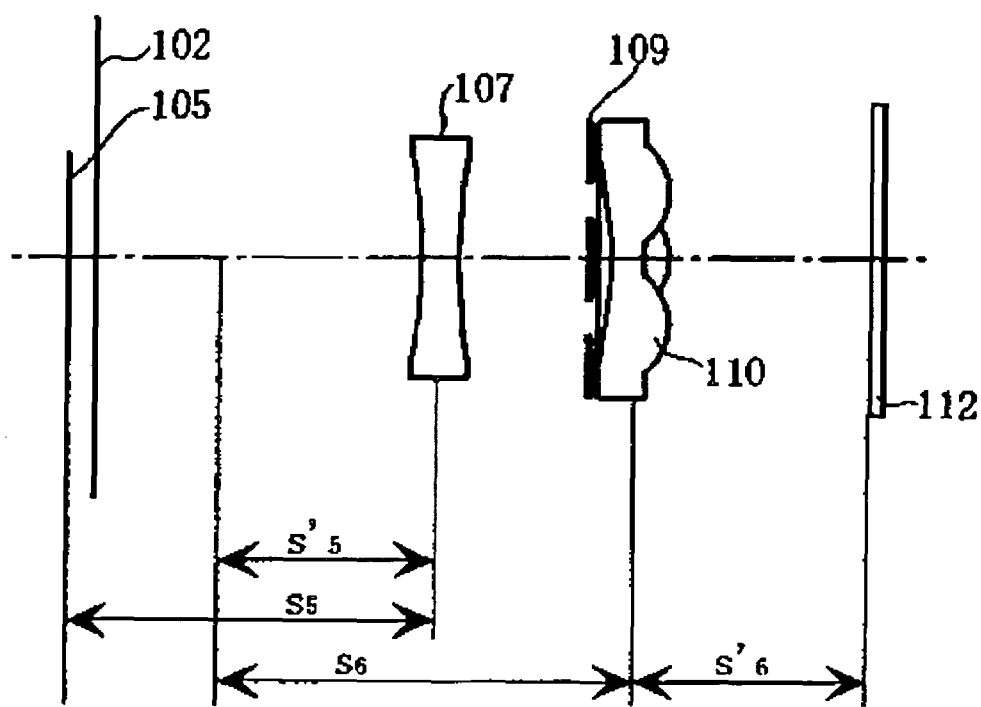

Next, the image-forming magnification in the secondary image-forming optical system will be calculated. FIGS. 11A and 11B shows the straight layout of the secondary image-forming optical system. FIG. 11A and FIG. 11B correspond to FIG. 6 and FIG. 7, respectively. As shown, the distance from each optical member to each image-forming point is defined. The primary image-forming plane 105 of the focus detection optical system is regarded as an object plane, and the sensor chip 112 is regarded as the image plane.

The infrared cut glass 108 and the cover glass 111 which are the flat plates are omitted since they have no optical powers. In FIG. 11A, the cylindrical lens 107 is also omitted since it acts as the flat plate. Each optical member is assumed to be infinitely thin and the principal point or the like is ignored.

First, in the vertical section of FIG. 11A, only the secondary image-forming lens 110 needs to be considered as the optical member relating to secondary image-forming, so that the pupil image-forming magnification βVI is represented by:

$$\beta_{VI} = \frac{s'_4}{s_4} \quad (6)$$

On the other hand, in the horizontal section of FIG. 11B, the virtual image through the cylindrical lens 107 is focused on the sensor chip 112 by the secondary image-forming lens 110, so that the total image-forming magnification is equal to the product of the image-forming magnification by the cylindrical lens 107 and the image-forming magnification by the secondary image-forming lens 110. The image-forming magnification βHI is represented by:

$$\beta_{HI} = \frac{s'_5}{s_5} \cdot \frac{s'_6}{s_6} \quad (7)$$

where s6 and s'6 can be represented using s4 and s'4 by:

$$s_6 = s_4 - s_5 + s'_5$$

$$s'_6 = s'_4 \quad (8)$$

The expression (8) is substituted into the expression (7) for expression using the βVI in the expression (6) as:

$$\beta_{HI} = \frac{s'_4 \cdot s'_5}{s_5(s_4 - s_5 + s'_5)} = \beta_I \cdot \frac{s_4 \cdot s'_5}{s_5(s_4 - s_5 + s'_5)} \quad (9)$$

The difference between the denominator and the numerator is calculated as:

$$(\text{denominator}) - (\text{numerator}) = (s_4 - s_5) \cdot (s'_5 - s'_5) \quad (10)$$

Since (s4−s5)<0 and (s4−s'4)<0, the solution of the expression (10) is larger than zero, that is, (denominator)>(numerator). In addition, since (denominator)>0 and (numerator)>0, the fraction term of the expression (10) takes a value larger than zero and smaller than one, and βVI<βHI when βVI<0 and βHI<0.

In other words, the absolute value of the image-forming magnification on the sensor chip 112 in the horizontal direction is smaller than that in the vertical direction, and the formed optical image has a shape shrunk in the horizontal direction.

Figure 12:
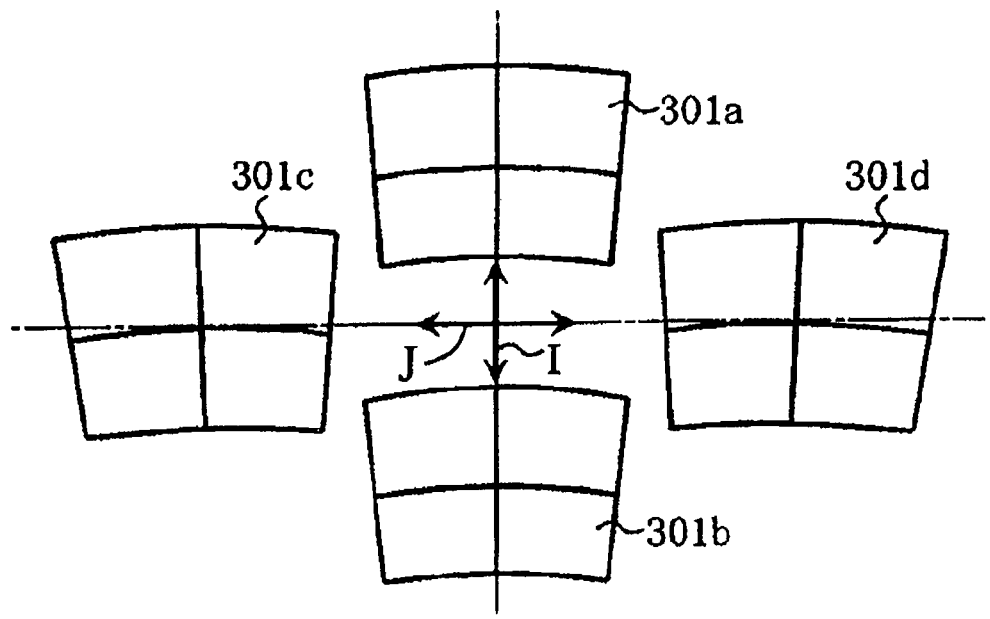
FIG. 12 shows optical images on the sensor chip in Embodiment 1.
Figure 13:
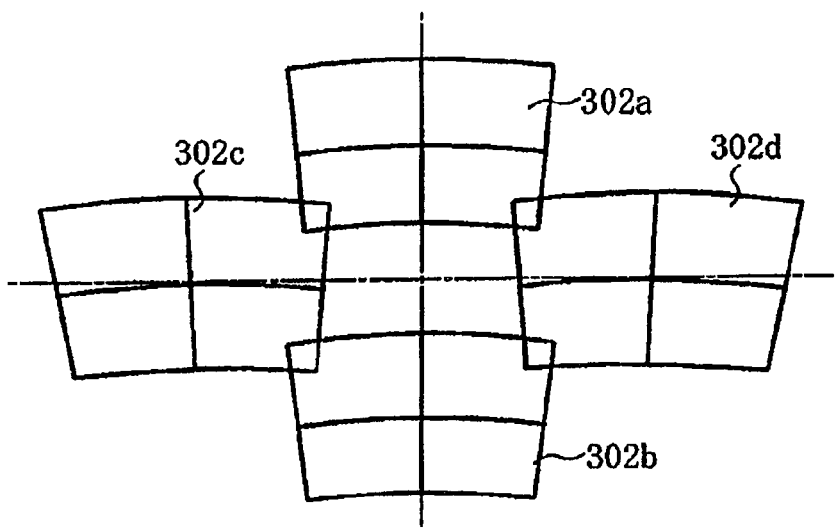
FIG. 13 shows optical images on the sensor chip when the cylindrical lens is not present.

FIGS. 12 and 13 show the shapes. FIG. 12 shows the optical images on the sensor chip 112 in Embodiment 1 and FIG. 13 shows optical images on the sensor chip 112 when the cylindrical lens 107 is not used as in the prior art.

In FIG. 12, a pair of optical images 301a and 301b and a pair of optical images 301c and 301d are formed by the luminous fluxes which passed through the paired openings and the paired lens portions. The indexes a, b, c, and d correspond to the indexes of the respective openings and lens portions. The same applies to a pair of optical images 302a and 302b and a pair of optical images 302c and 302d in FIG. 13.

Figure 14:
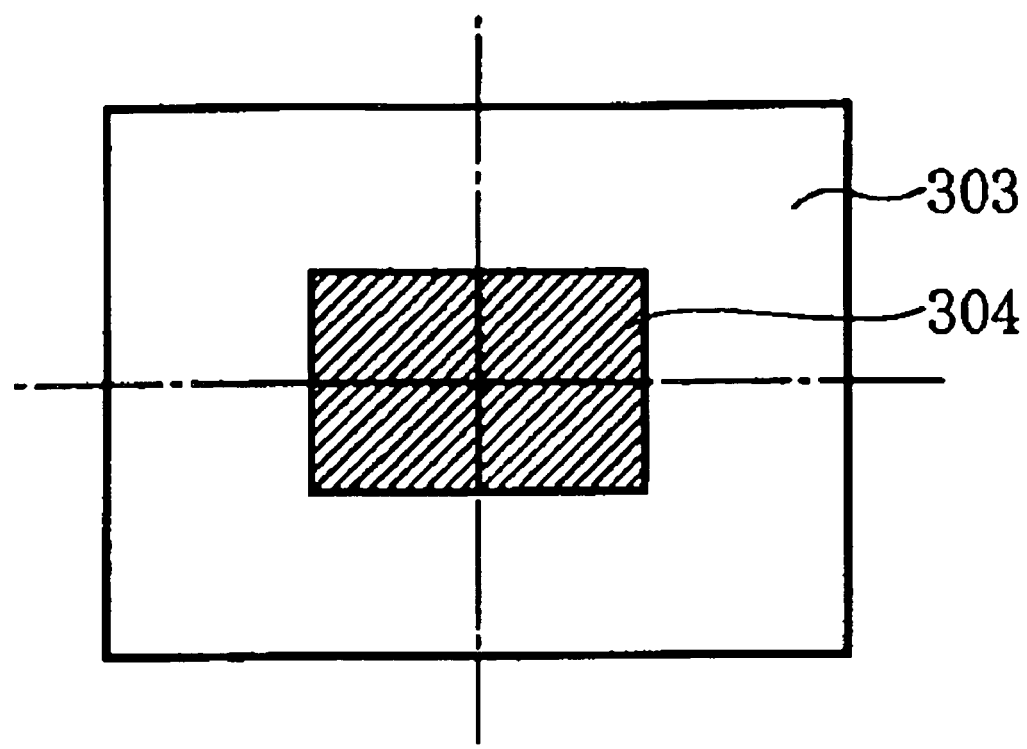
FIG. 14 shows a focus detection area in an image-taking range in Embodiment 1.

The pair of optical images 301a and 301b corresponds to a first pair of optical images, and the pair of optical images 301c and 301d corresponds to a second pair of optical images. The optical images are obtained by projecting the rectangle of the focus detection area set in the image-taking screen on the sensor chip 112. FIG. 14 shows a shaded rectangular focus detection area 304 set in an image-taking range 303.

Each of the optical images in FIG. 12 is warped in a generally fan shape due to the sub mirror 104 and the cylindrical lens 107 provided at an angle with respect to the optical axis L. Arrows I and J correspond to the sections in which the image-forming magnification is calculated in FIGS. 11A and 11B. The image-forming magnification in the direction of the arrow I is calculated in the section of FIG. 11A, while the image-forming magnification in the direction of the arrow J is calculated in the section of FIG. 11B. Thus, the four optical images have the shapes shrunk in the direction of the arrow J. Since the pair of optical images 301c and 301d are spaced further apart due to the optical power of the cylindrical lens 107, the optical images are formed at predetermined intervals between them without interference with each other.

As apparent from FIG. 3, the directions of the arrows I and J match the directions in which the pair of openings of the aperture 109 is arranged. Since each opening of the aperture 109 provides the pupil dividing, the directions of the arrows I and J optically correspond to the pupil dividing directions. The directions of the arrows I and J correspond to the pupil dividing directions shown by the arrow E and the arrow F in FIG. 9, respectively. Thus, the four optical images have shapes shrunk in the direction of the arrow J optically corresponding to the direction of the arrow F, of the directions of the arrows E and F which are the two pupil dividing directions.

On the other hand, each optical image in FIG. 13 is similarly warped in a generally fan shape, but each optical image is not shrunk horizontally since the cylindrical lens 107 is not present. In addition, the interval between optical images 302c and 302d is reduced, which causes interference. As described above, the first optical action of the cylindrical lens 107 is to increase the interval between the optical images 301c and 301d. It has the additional optical action of compressing the four optical images horizontally. The two optical actions can prevent interference between the optical images.

Since the directions of the arrows I and J correspond to the pupil dividing directions, the optical images are moved in the directions of the arrows I and J in association with defocus of the image-taking optical system 101. Specifically, the optical images 301a and 301b are moved in the direction of the arrow I, and the optical images 301c and 301d are moved in the direction of the arrow J.

Thus, in the sensor areas 112a and 112b corresponding to the optical images 301a and 301b, pixels are arranged in the direction of the arrow I. In the sensor areas 112c and 112d corresponding to the optical images 301c and 301d, pixels are arranged n the direction of the arrow J.

Figure 15:
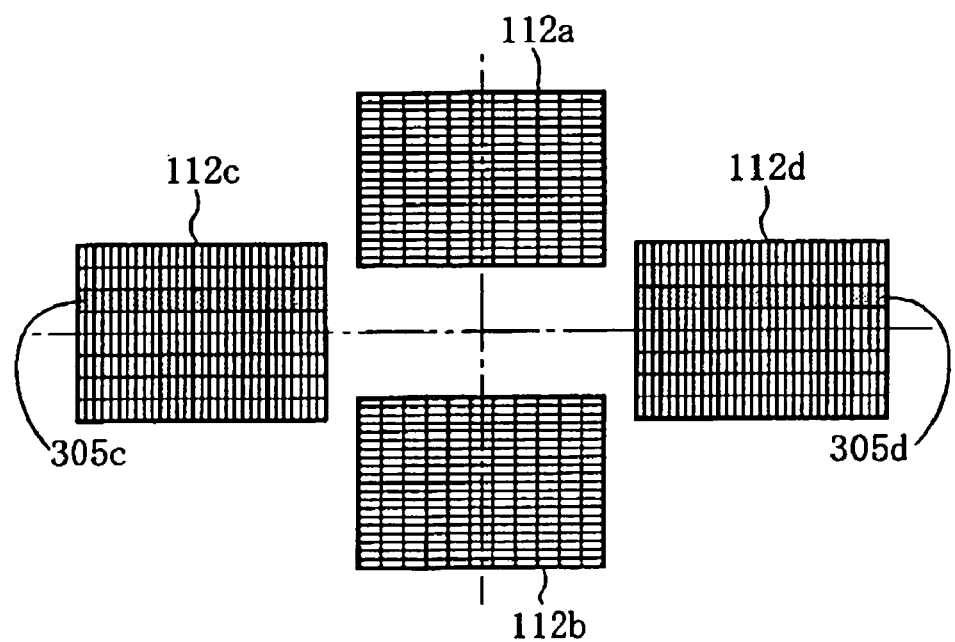
FIG. 15 is an enlarged view showing the sensor area of FIG. 2.

FIG. 15 is an enlarged view showing the respective sensor areas in FIG. 5, and the pixels arranged in the directions of the optical image movement can be seen. In the sensor areas 112a and 112b, 11 columns of pixels each arranged vertically are formed. In the sensor areas 112c and 112d, 8 rows of pixels each arranged horizontally are formed. Although more pixels and more columns and rows are actually arranged, the fewer pixels and the fewer columns and rows are shown to avoid the complexity in the figure.

Based on the direction of the pixel arrangement, the sensor areas 112a and 112b detect a phase difference in an object having a contrast component primarily in the vertical direction, that is, the horizontal line detection is performed, and the vertical line detection is performed in the sensor areas 112c and 112d. As an example, a pixel row 305c shown as a shaded area is taken. A pixel row 305d corresponds thereto in the sensor area 112d. An image signal is formed from an output signal from each pixel in the pair of the pixel rows.

Figure 16:
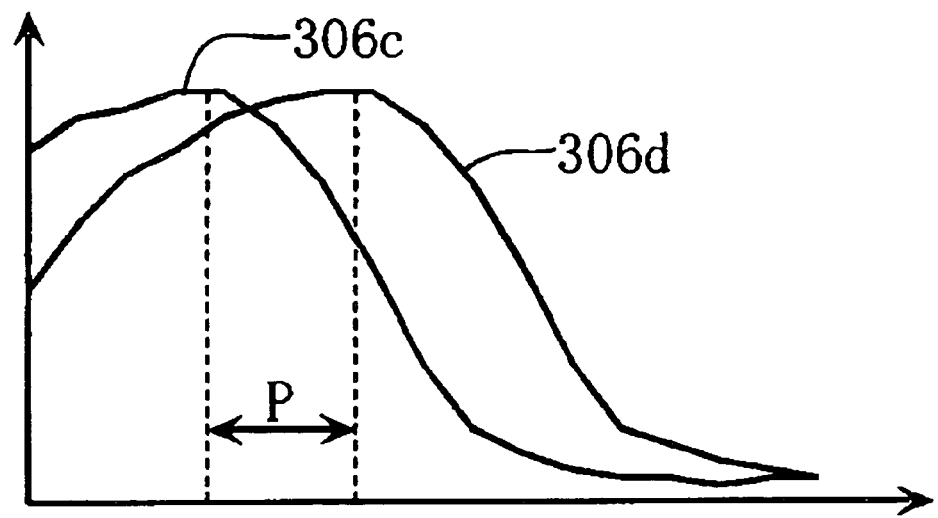
FIG. 16 is a graph showing a pair of image signals at defocus.

FIG. 16 is a graph showing the pair of image signals formed from the pair of pixel rows 305c and 305d at defocus. The horizontal axis represents the position of a pixel in the pixel rows, while the vertical axis represents the intensity of the output signal.

An image signal 306c and an image signal 306d are provided from the pixel row 305c and the pixel row 305d, respectively. A phase difference is found between the pair of image signals, and the phase difference P shown by an arrow in FIG. 16 is determined by using a well-known correlation means or the like. The defocus amount is then calculated from the phase difference P to perform focus adjustment of the image-taking optical system 101. The pair of image signals in FIG. 16 is obtained when the optical images-are moved in directions in which they are further apart from each other on the sensor chip 112, in which case the focal point of the image-taking optical system 101 is located across the primary image-forming plane 102.

Focus adjustment is performed not only in the pair of pixel rows 305c and 305d but also in the other pixel rows. It is performed in the same manner in the sensor areas 112a and 112b. Then, both of the vertical line detection and the horizontal line detection can be performed over the wide range of the image-taking screen. While the image signals in FIG. 16 are formed from the output signals from all the pixels in the pixel rows, a pixel row is divided into desired lengths and image signals as shown in FIG. 16 are formed in the respective divided pixel rows when the pixel row is extremely long. The specific length of the pixel row may be conveniently determined on the basis of the length of the pixel row in the image-taking screen and the focal length of the image-taking optical system 101 since interference between a far object and a near object or the like is likely to occur when the pixel row is extremely long with respect to the size of an object.

While Embodiment 1 employs the optical member formed of the cylindrical surface as the optical member having the anamorphic optical power, it is possible to use a toric surface having an optical power on each of the directions of the principal axes 209x and 209y. In this case, it is possible to freely set not only the interval between the pair of optical images 301c and 301d in FIG. 12 but also the interval between the pair of optical images 301a and 301b. This allows the efficient arrangement of the sensor areas on the sensor chip 112 to reduce the area of the sensor chip, thereby providing the effect of a cost reduction.

Embodiment 2

Figure 17:
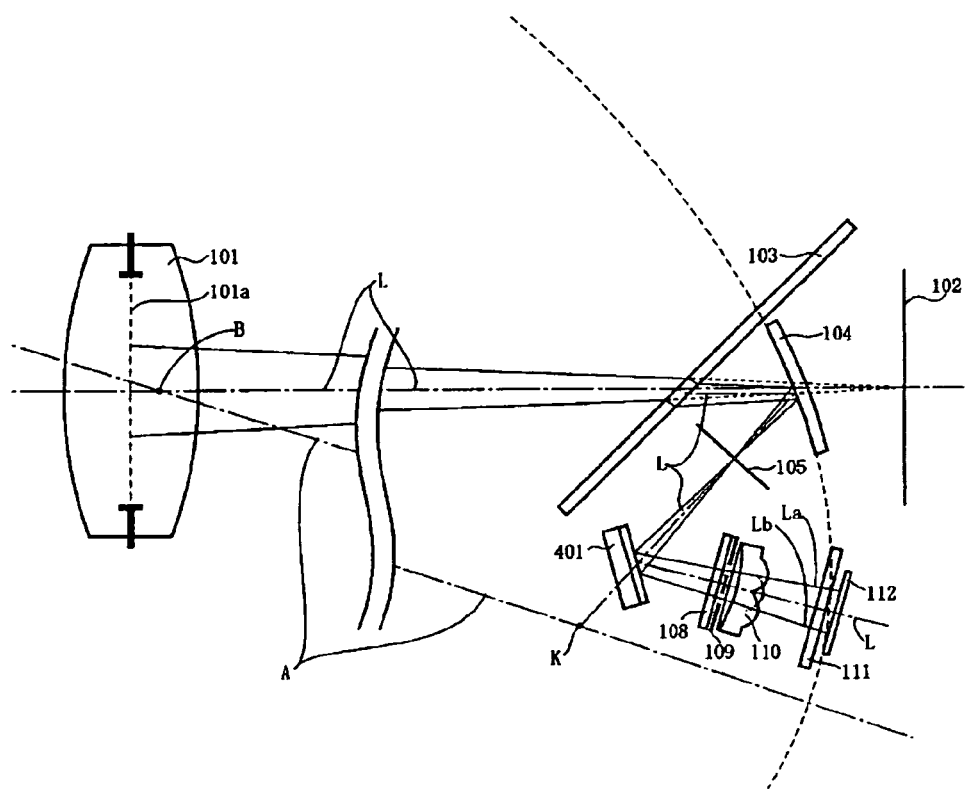
FIG. 17 is a section view of the center of a camera which is Embodiment 2 of the present invention.

While Embodiment 1 employs the refractive optical member as the optical member having the anamorphic optical power, Embodiment 2 employs a reflective optical member. FIG. 17 is a section view of the center of a camera in Embodiment 2 and shows only portions associated with focus detection.

In FIG. 17, the flat mirror 106 and the cylindrical lens 107 in FIG. 2 are not used, and a curved mirror 401 is disposed at the position of the flat mirror 106. The curved mirror 401 has an anamorphic optical power and corresponds to the reflective optical member in claims. In Embodiment 2, a cylindrical reflective surface having a negative optical power is used in the curved mirror 401.

The curved mirror 401 has substantially the same optical power as that of the cylindrical lens 107 in Embodiment 1. Since the curved mirror 401 is the reflective optical member, it has a convex shape when it has a negative optical power as in Embodiment 1. It has the optical power in the direction orthogonal to the paper.

Since the cylindrical lens 107 is not used in Embodiment 2, an infrared cut glass 108 and the following members are shifted toward the mirror 401 by the optical path length equivalent to the air distance for the cylindrical lens 107. Thus, a sub mirror 104 has a focal point on the side of an aperture 109 at a point K which is closer to the curved mirror 401. The optical actions and the structure of the other members are identical to those in Embodiment 1, so that description thereof is omitted.

Figure 18:
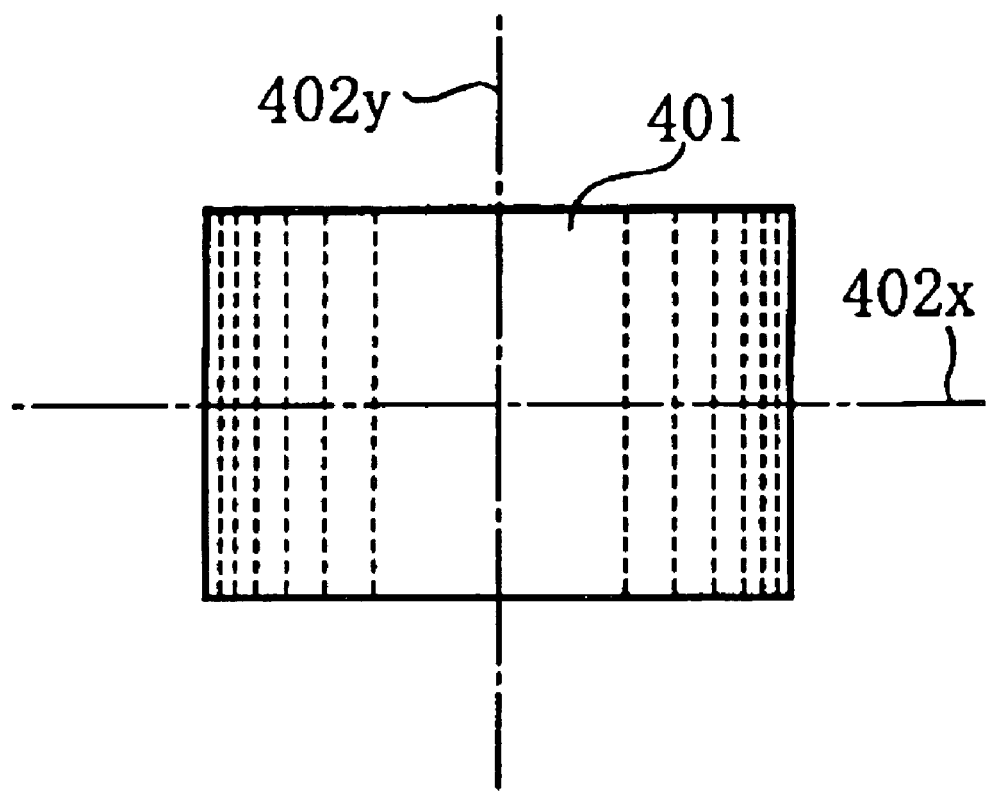
FIG. 18 is a plan view showing a curved mirror in Embodiment 2.
Figure 19:
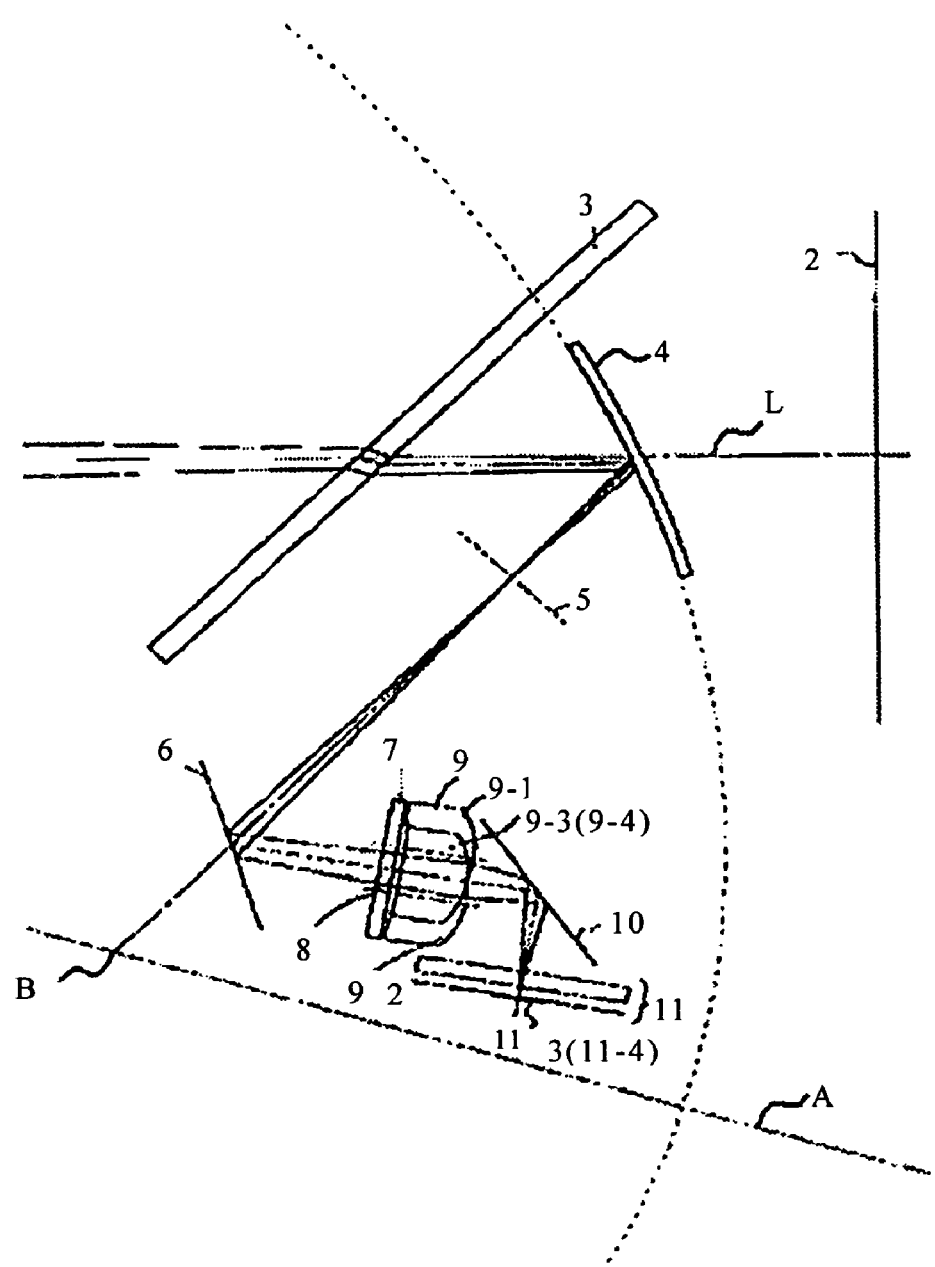
FIG. 19 is a section view of the center of a camera in a prior art.
Figure 20:
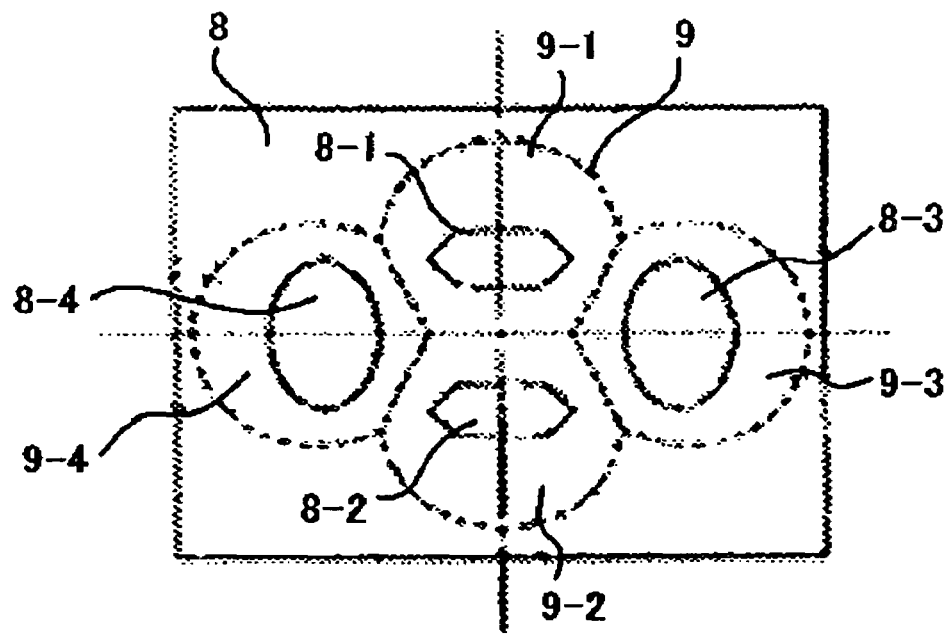
FIG. 20 is a plan view showing an aperture in the prior art.
Figure 21:
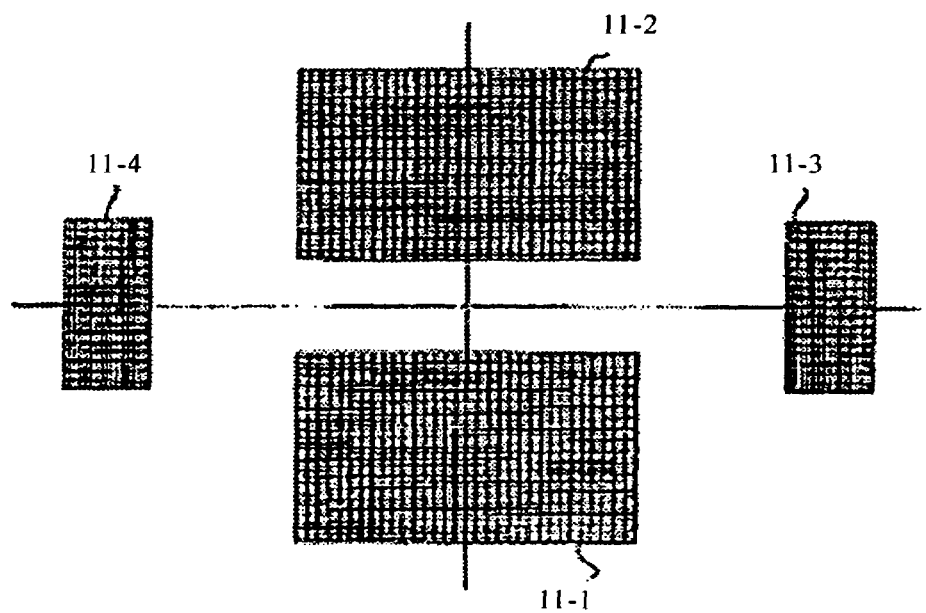
FIG. 21 is a plan view showing a sensor chip in the prior art.
Figure 22:
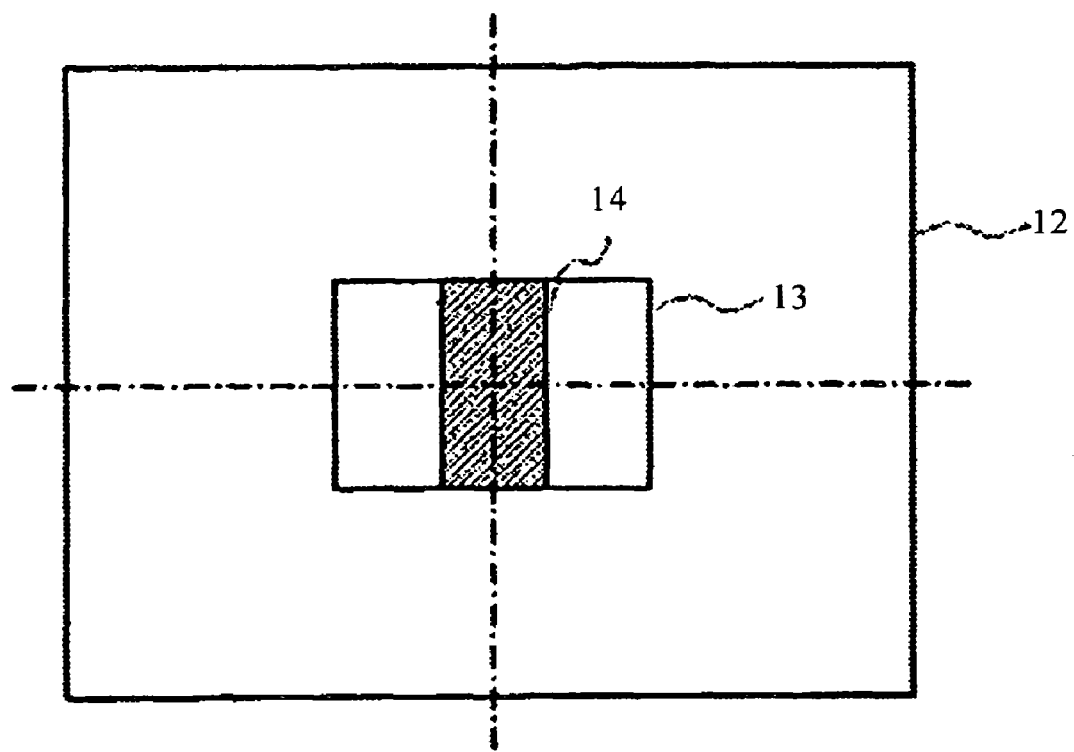
FIG. 22 shows reversely projected sensor areas in an image-taking range.

FIG. 18 is a plan view showing the reflective surface of the curved mirror 401 in FIG. 17. To be exact, FIG. 18 shows the reflective surface viewed from the bisector of the angle formed by an optical axis L turned by the sub mirror 104 and the optical axis L turned again by the curved mirror 401, that is, the normal to the reflective surface.

In FIG. 18, dotted lines show contour lines which represent the height of the curved mirror in the direction perpendicular to the paper and are given to facilitate the understanding of the shape of the surface. The curved surface has a convex shape with a larger height at a position closer to the center. Dashed lines 402x and 402y show two principal axes of the curved mirror 401. However, the cylindrical surface is used in Embodiment 2, so that any line may serve as the principal axis 209x as long as it is a line in parallel with the optical axis L.

Alternatively, a toric surface may be used.

The optical axis L is set to pass through near the intersection of the principal axes 402x and 402y. Thus, the four shaded areas in FIG. 9 have substantially equally shrunk shapes horizontally centered on the optical axis L. As described above, the same effects can be provided as those in Embodiment 1 by replacing the cylindrical lens 107 with the curved mirror 401 having substantially the same power as that of the cylindrical lens 107. Embodiment 2 differs from Embodiment 1 in that the reflective surface is used and thus the curved mirror 401 involves, in principle, no chromatic aberration due to reflection of light beams. It is thus possible to realize a more accurate secondary image-forming optical system than in Embodiment 1. In addition, the effect of a cost reduction can be provided since the number of the parts is reduced by one.

As described above, in the focus detection apparatus according to Embodiment 2, the optical member having the anamorphic optical power is disposed between the primary image-forming plane and the secondary image-forming plane. This can increase the interval between the pair of optical images on the sensor chip and compress the optical images on the sensor chip in the predetermined directions, thereby making it possible to perform the vertical line detection and the horizontal line detection over the wide area in the image-taking range.

Furthermore, although the description was given of the case where the luminous flux is divided in two directions orthogonal to each other in the above-mentioned embodiments, the present invention can provide the similar effect to a case where the luminous flux is divided in at least two directions different from each other.

This application claims foreign priority benefits based on Japanese Patent Application No. 2004-177182, filed on Jun. 15, 2004, which is hereby incorporated by reference herein in its entirety as if fully set forth herein.

What is claimed is:

1. A focus detection apparatus which detects a focus state of an image-taking optical system, comprising:
    an optical system, which divides a luminous flux from the image-taking optical system to form a first pair of optical images having an interval between them in a first direction and a second pair of optical images having an interval between them in a second direction; and
    a photoelectrical conversion device, which photoelectrically converts each of the optical images,
    wherein the optical system includes an optical member having an anamorphic power, which provides a first optical action widening the interval between the first pair of the optical images in the first direction as compared to a case where the optical member is not provided, the first optical action being different from a second optical action of the optical member for the second pair of the optical images in the second direction.

2. The focus detection apparatus according to claim 1, wherein the first optical action is an optical action widening the interval between the first pair of the optical images in the first direction further than the interval between the second pair of the optical images in the second direction.

3. The focus detection apparatus according to claim 1, further comprising:
    a pupil dividing member, which divides an exit pupil of the image-taking optical system in the first and second directions; and
    a secondary image-forming lens, which is disposed closer to the photoelectrical conversion device than a primary image-forming plane of the image-taking optical system, and forms the first and second pairs of optical images,
    wherein the optical member is disposed between the primary image-forming plane and the secondary image-forming lens.

4. The focus detection apparatus according to claim 1, wherein the optical member has a negative optical power, which is larger in the first direction than in the second direction.

5. The focus detection apparatus according to claim 1, wherein the optical member is a refractive optical member.

6. The focus detection apparatus according to claim 1, wherein the optical member is a reflective optical member.

7. A focus detection apparatus which detects a focus state of an image-taking optical system, comprising:
    an optical system, which divides a luminous flux from the image-taking optical system to form a plurality of optical images; and
    a photoelectrical conversion device, which photoelectrically converts each of the optical images,
    wherein the optical system includes an optical member having an anamorphic power, which provides a first optical action compressing the optical images in a first direction further than a second optical action compressing the optical images in a second direction.

8. The focus detection apparatus according to claim 7, further comprising:
    a pupil dividing member, which divides an exit pupil of the image-taking optical system in the first and second directions; and
    a secondary image-forming lens, which is disposed closer to the photoelectrical conversion device than a primary image-forming plane of the image-taking optical system, and forms a first pair of optical images having an interval between them in the first direction and a second pair of optical images having an interval between them in the second direction,
    wherein the optical member is disposed between the primary image-forming plane and the secondary image-forming lens.

9. The focus detection apparatus according to claim 7, wherein the optical member has a negative optical power, which is larger in the first direction than in the second direction.

10. The focus detection apparatus according to claim 7, wherein the optical member is a refractive optical member.

11. The focus detection apparatus according to claim 7, wherein the optical member is a reflective optical member.

12. A focus detection apparatus which detects a focus state of an image-taking optical system, comprising:
    a pupil dividing member, which divides an exit pupil of the image-taking optical system in a first direction and a second direction;
    a secondary image-forming lens, which forms a first pair of optical images and a second pair of optical images from a luminous flux from a primary image-forming plane of the image-taking optical system; and
    a photoelectrical conversion device, which photoelectrically converts each of the optical images,
    wherein an optical member having an anamorphic optical power is provided between the primary image-forming plane and the secondary image-forming lens.

13. The focus detection apparatus according to claim 12, wherein the optical member is a refractive optical member.

14. The focus detection apparatus according to claim 12, wherein the optical member is a reflective optical member.

15. An optical apparatus comprising:
the focus detection apparatus according to claim 1.

16. An optical apparatus comprising:
the focus detection apparatus according to claim 7.

17. An optical apparatus comprising:
the focus detection apparatus according to claim 12.

* * * * *